US009196056B2

(12) United States Patent
Hall

(10) Patent No.: US 9,196,056 B2
(45) Date of Patent: Nov. 24, 2015

(54) ELECTRO-OPTICAL SYSTEM AND METHOD FOR ANALYZING IMAGES OF A SCENE TO IDENTIFY THE PRESENCE OF A TARGET COLOR

(71) Applicant: Manufacturing Techniques, Inc. (MTEQ), Kilmarnock, VA (US)

(72) Inventor: John M. Hall, Stafford, VA (US)

(73) Assignee: Manufacturing Techniques, Inc., Kilmarnock, VA (US)

( * ) Notice: Subject to any disclaimer, the term of this patent is extended or adjusted under 35 U.S.C. 154(b) by 0 days.

(21) Appl. No.: 14/460,932

(22) Filed: Aug. 15, 2014

(65) Prior Publication Data

US 2015/0049941 A1       Feb. 19, 2015

Related U.S. Application Data

(60) Provisional application No. 61/867,252, filed on Aug. 19, 2013.

(51) Int. Cl.
| | |
|---|---|
| *G06K 9/00* | (2006.01) |
| *G06T 7/40* | (2006.01) |
| *G01J 3/36* | (2006.01) |
| *G01J 3/46* | (2006.01) |
| *G06T 7/00* | (2006.01) |
| *G01J 5/00* | (2006.01) |

(52) U.S. Cl.
CPC . *G06T 7/408* (2013.01); *G01J 3/36* (2013.01); *G01J 3/463* (2013.01); *G06K 9/00362* (2013.01); *G06T 7/0081* (2013.01); *G01J 2005/0077* (2013.01); *G06T 2207/10024* (2013.01); *G06T 2207/10048* (2013.01); *G06T 2207/20148* (2013.01); *G06T 2207/30196* (2013.01)

(58) Field of Classification Search
USPC ............... 382/165, 162, 170, 181; 89/41.01, 89/41.17; 42/84; 250/208.1, 316.1, 332; 348/241; 349/22; 359/350
See application file for complete search history.

(56) References Cited

U.S. PATENT DOCUMENTS

| | | | | |
|---|---|---|---|---|
| 4,861,992 A | * | 8/1989 | Clark et al. | 250/316.1 |
| 5,014,131 A | * | 5/1991 | Reed et al. | 348/241 |
| 5,764,819 A | * | 6/1998 | Orr et al. | 382/110 |

(Continued)

OTHER PUBLICATIONS

Abel S. Nunez, A Physical Model of Human Skin and Its Application for Search and Rescue, Air Force Institute of Technology, Dec. 2009, 205 pages, Wright-Patterson Air Force Base, Ohio.

(Continued)

*Primary Examiner* — Anh Do
(74) *Attorney, Agent, or Firm* — The Webb Law Firm

(57) ABSTRACT

An electro-optical system and method are provided for analyzing images of a scene to identify the presence of a target color, such as human skin tones. The system includes a thermal detector for obtaining a thermal image of the scene within a thermal waveband. The system also includes at least one additional detector for obtaining at least one additional image of the scene at an additional waveband different from the thermal waveband. The system also includes a controller. The controller is configured to: process the thermal image to identify portions of the scene having a temperature exceeding a threshold value; process the additional image to identify portions of the scene having a target color; and output a positive response if a same portion of the scene is identified in the thermal image and the additional image.

20 Claims, 4 Drawing Sheets

(56) References Cited

U.S. PATENT DOCUMENTS

| | | | |
|---|---|---|---|
| 6,212,824 B1* | 4/2001 | Orr et al. | 47/58.1 R |
| 6,690,822 B1 | 2/2004 | Chen et al. | |
| 6,871,439 B1* | 3/2005 | Edwards | 42/84 |
| 6,975,898 B2* | 12/2005 | Seibel | 600/473 |
| 7,426,296 B2 | 9/2008 | Lee et al. | |
| 7,446,316 B2 | 11/2008 | Kilgore et al. | |
| 7,530,948 B2* | 5/2009 | Seibel et al. | 600/178 |
| 7,869,043 B2 | 1/2011 | Campbell et al. | |

OTHER PUBLICATIONS

Keith R. Peskosky, Design of a Monocular Multi-Spectral Skin Detection, Melanin Estimation, and False-Alarm Suppression System, Air Force Institute of Technology, Mar. 2010, 116 pages, Wright-Patterson Air Force Base, Ohio.

Adam Lee Brooks, Improved Multispectral Skin Detection and Its Application to Search Space Reduction for Dismount Detection Based on Histograms of Oriented Gradients, Air Force Institute of Technology, Mar. 2010, 183 pages, Wright-Patterson Air Force Base, Ohio.

Elli Angelopoulou, Understanding the Color of Human Skin, Human Vision and Electronic Imaging VI, Jun. 2001, 1 page, vol. 4299, SPIE Proceedings.

Brand, et al., A Comparative Assessment of Three Approaches to Pixel-Level Human Skin-Detection, Proceedings of 15th International Conference on Pattern Recognition, Sep. 2000, 2 pages.

Mirabella, The Color of Women—The Fitzpatrick Skin Type System, Mirabella Beauty Products, LLC, 2009, 2 pages.

Giovani Gomez, On Selecting Colour Components for Skin Detection, Proceedings of the International Conference on Pattern Recognition, 2002, 4 pages.

Vezhnevets, et al., A Survey on Pixel-Based Skin Color Detection Techniques, Graphics and Media Laboratory, Faculty of Computational Mathematics and Cybernetics, Moscow State University, 8 pages, Moscow, Russia.

Elli Angelopoulou, The Reflectance Spectrum of Human Skin, GRASP Laboratory, Department of Computer and Information Science, University of Pennsylvania, Dec. 20, 1999, 15 pages, Pennsylvania.

Zonios, et al., Skin Melanin, Hemoglobin, and Light Scattering Properties can be Quantitatively Assessed in Vivo Using Diffuse Reflectance Spectroscopy, Wellman Laboratories of Photomedicine, Massachusetts General Hospital, Harvard University Medical School, Aug. 24, 2001, pp. 1452-1457, Massachusetts.

Angelopoulou, et al., Multispectral Skin Color Modeling, National Science Foundation Under Grant No. 0085864, Jun. 22, 2001, pp. 1-15.

Nunez, et al., Detection of Human Skin in Near Infrared Hyperspectral Imagery, Air Force Institute of Technology, Department of Electrical Engineering, 2 pages, Ohio.

Zhang, et al., Determination of Human Skin Optical Properties From Spectrophotometric Measurements Based on Optimization by Genetic Algorithms, Journal of Biomedical Optics, Mar./Apr. 2005, pp. 024030-1-024030-11, vol. 10(2), California.

I.M. Gibson, Measurement of Skin Colour in Vivo, Unilever Research Laboratory, Society of Cosmetic Chemists of Great Britain, 1971, pp. 725-740, vol. 22, Isleworth, Middlesex, Great Britain.

Matthew P. Hornung, Flexible Computing Architecture for Real Time Skin Detection, Air Force Institute of Technology, Mar. 2010, 94 pages, Wright-Patterson Air Force Base, Ohio.

* cited by examiner understanding # ELECTRO-OPTICAL SYSTEM AND METHOD FOR ANALYZING IMAGES OF A SCENE TO IDENTIFY THE PRESENCE OF A TARGET COLOR

BACKGROUND OF THE DISCLOSURE

1. Field of the Disclosure

The present disclosure is related to an electro-optical sensor system and method of use that analyzes images of a scene to identify the presence of specific coloration, such as skin tones, and more particularly, to a system and method for use at night and in other environments with minimal ambient lighting.

2. Description of Related Art

Systems are known for analyzing color video imagery for the purposing of detecting particular tones of color that are common to many varieties of human skin. Currently several imaging techniques for detection of human skin tones during the daytime are known. Such systems can only be used where ambient light from the sun and/or artificial light sources provides a full spectrum of light energy from which the skin tone target signatures can be detected. Some systems use image processing of images obtained from color camera systems. More recently, systems using infrared cameras have also been developed. To date, the best results have been obtained when both visible and infrared cameras are combined. Several exemplary prior art systems for identification of human skin tone in a captured image are discussed herein.

Color—RGB Only: Much work has been done to utilize commercial video camera equipment, which provides either Red Green Blue (RGB), luminance-chrominance-chrominance YCrCb, or other similar types of color space renderings of the visible spectrum to identify skin tones in a captured image. An exemplary RGB system is disclosed in U.S. Pat. No. 6,690,822 to Chen et al. An exemplary YCrCb system is disclosed in U.S. Pat. No. 7,426,296 to Lee et al. These systems and methods, ultimately all based on visible color spectrum, often result in "false alarms" wherein objects in the scene are mistakenly read as human skin.

Short Wave Infrared Only: Systems that use the Short Wave Infrared (SWIR) waveband alone are also know for detecting the presence of human skin tones. In particular, the technique generally requires two separate sub-wavebands, such as a first waveband of about 1.0 to 1.3 microns and a second waveband of about 1.4 to 1.7 microns. Alternatively, the near infrared band (NIR) between 0.9 to 1.0 microns can be used instead of the first SWIR waveband. An active medical device has been developed which takes advantage of this phenomena. See U.S. Pat. No. 7,446,316 to Kilgore et al.

Color—RGB and SWIR: Research pioneered by students at the Air Force Institute of Technology (AFIT) in Wright Patterson Air Force Base, Ohio, have discovered that the number of false alarms can be reduced if the scene is imaged and analyzed in both the visible (approx. 0.4 to 0.7 micron wavelength) and short-wave infrared (1.0-2.0 micron wavelength) spectra. See e.g., Brooks, Adam L., *Improved Multispectral Skin Detection and its Applications to Search Space Reduction for Dismount Detection Based on Histograms of Oriented Gradients*, Thesis, Air Force Institute of Technology, March 2010. However, the AFIT research is based on analysis of discrete wavelengths within those spectra bands using data from a hyperspectral system. A hyperspectral system is too large and cumbersome for portable use. See also Nunez, Abel, *A Physical Model of Human Skin and Its Application for Search and Rescue*, Dissertation, Air Force Institute of Technology, December 2009 and Peskosky, Keith, *Design of a Monocular Multispectral Skin Detection, Melanin Estimation, and False Alarm Suppression System*, Thesis, Air Force Institute of Technology, March 2010.

These prior art imaging systems do not address performing a skin tone detection function at night or in other low ambient light conditions. Thermal imaging cameras and detectors for detection of objects at night are also known in the prior art. Thermal detectors operate in the 3-12 micron spectral band. Most objects at earthly temperatures emit radiation in this region as a strongly correlated function of their temperature. Thermal imaging thus relies only on emissions based on the target temperature, and does not require external illumination from the sun or artificial lighting. In the thermal band, and typically at night, warm-blooded animals and humans tend to emit more radiation than the surrounding environment, including the ground, vegetation, and most man-made objects such as buildings and parked automobiles. A thermal imaging system is therefore capable of detecting warm bodies against such backgrounds. However, a thermal detector would also detect other warm-blooded animals for the same reasons. Accordingly, an operator who is specifically looking for human targets will experience "false alarms" from animals identified by a thermal imaging system.

In view of these shortcomings of existing imaging systems, a need exists for a portable image identification or processing system that detects the presence of specific warm objects at night or in low ambient light. The system should have the ability to operate over a wide range of lighting conditions and against a variety of backgrounds. When used to identify a human, the system should be capable of skin detection with a high accuracy over most ranges of human skin tones. The system should also be capable of real time operation (e.g., a frame rate in excess of approximately 15 Hz) and should have a low false alarm rate. The presently disclosed system is adapted to address these issues.

SUMMARY OF THE DISCLOSURE

The present disclosure is directed to an electro-optical system and method for analyzing images of a scene to identify the presence of a target color, such as human skin tones. The system is configured to analyzes video images of the scene captured in a variety of optical spectra throughout the long wave infrared (LWIR) or thermal spectra, short-wave infrared (SWIR) spectra, and near-infrared (NIR) spectra and to identify the presence of a target color within the scene. The system and method may incorporate active illumination sources in the NIR/SWIR spectral bands. Accordingly, the system and method are particularly applicable at night or in other dark environments where ambient lighting is minimal. The system may also include a visual display that shows or marks portions of the image identified by the processing techniques.

According to one aspect of the invention, the system includes a thermal detector for obtaining a thermal image of the scene within a thermal waveband. The system also includes at least one additional detector for obtaining at least one additional image of the scene at an additional waveband different from the thermal waveband. The system also includes a controller. The controller is configured to: process the thermal image to identify portions of the scene having a temperature exceeding a threshold value; process the additional image to identify portions of the scene having a target color; and output a positive response if a same portion of the scene is identified in the thermal image and the additional image.

In certain embodiment, the additional detector is an infrared detector or a visible light detector. In addition, the thermal detector may obtain thermal images of the scene in real time. The thermal detector may be configured to detect a waveband of between 3 and 5 microns or between 8 and 12 microns. Optionally, the controller may be configured to activate the additional detector to obtain the additional image when portions of the scene having a temperature exceeding a threshold value are identified by processing the thermal image.

In certain embodiments, the system may also include an illuminator that illuminates the scene with radiation in the additional waveband. The controller may be configured to activate the illuminator while the additional image is being obtained by the additional detector. The illuminator may include a light emitting diode, a laser diode, or a halogen bulb projector.

In certain further embodiments, the at least one additional detector may include a first infrared detector that obtains a first infrared image in a first infrared waveband and a second infrared detector that obtains a second infrared image in a second infrared waveband. The first waveband should be different than the second waveband. The first waveband may be a wavelength absorbed by the target color and the second waveband may be a wavelength reflected by the target color. For example, the first waveband may be between 1.4 and 1.7 microns and the second waveband may be between 0.9 and 1.3 microns. Optionally, the controller may be configured to process the first infrared image and the second infrared image by calculating a ratio of infrared intensity in the first infrared image and the second infrared image for each pixel and comparing the calculated ratio to a threshold ratio value.

In certain further embodiments, the system includes an alarm. The alarm may be triggered when the controller outputs a positive response. The system may also include a visual display configured to display the thermal image. For example, pixels of the thermal image showing portions of the scene where the target color is present may be replaced with brighter pixels when displayed on the visual display.

In another embodiment, the system includes a daylight system for identifying the presence of the target color in the scene in daylight or in other environments with ambient light. In some embodiments, the target color may be a range of possible human skin tones. Finally, the system may include a portable housing. The thermal detector, the at least one additional detector, and the controller may be at least partially contained within the housing.

According to another aspect of the invention, a method for analyzing images of a scene to identify a target color is provided. The method includes obtaining a thermal image of the scene; identifying a portion of the scene that has a temperature that exceeds a threshold value by processing the thermal image; obtaining an infrared image of the scene; identifying portions of the scene that include a target color by processing the infrared image; and outputting a positive response if a same portion of the scene is identified in both the thermal image and the infrared image.

In certain embodiments, the method also includes illuminating at least the portion of the scene identified in the thermal image while obtaining the infrared image. The step of obtaining the infrared image may include obtaining an infrared image in at least two distinct wavebands. The first waveband may be reflected by the target color and the second waveband may be absorbed by the target color.

Further details and advantages of the various embodiments described in detail herein will become clear upon reviewing the following detailed description of the various embodiments in conjunction with the accompanying drawing figures.

DESCRIPTION OF THE PREFERRED EMBODIMENTS

The illustrations generally show preferred and non-limiting embodiments of the systems and methods of the present disclosure. While the descriptions present various embodiments of the system and method, it should not be interpreted in any way as limiting the disclosure. Furthermore, modifications, concepts, and applications of the disclosure's embodiments are to be interpreted by those skilled in the art as being encompassed, but not limited to, the illustrations and descriptions herein.

Figure 1:
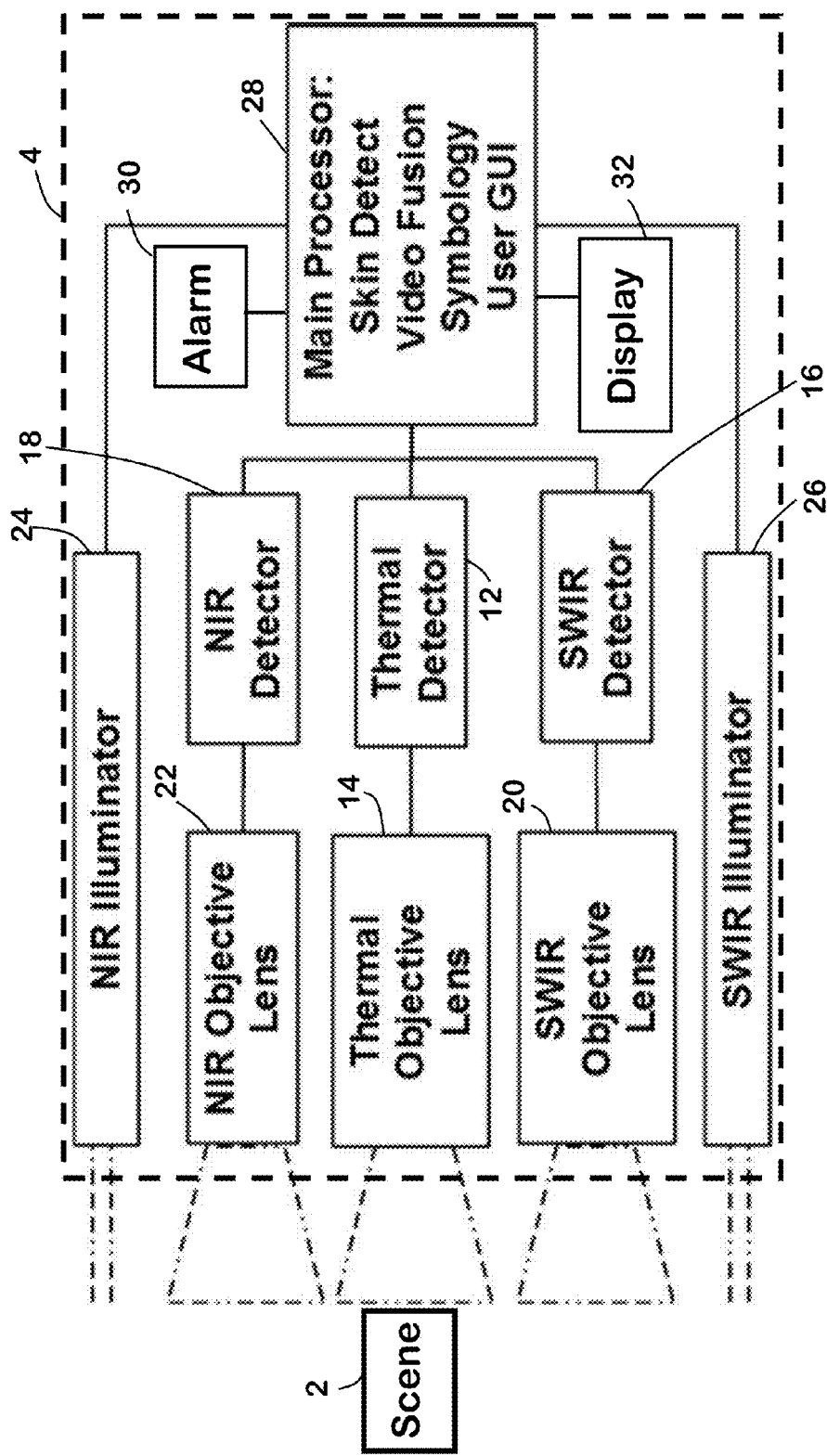
FIG. 1 is a schematic drawing of a system for analyzing images of a scene to identify a target color according to an embodiment of the invention.

With reference to FIG. 1, a system 10 for analyzing images of a scene 2 to identify a target color is illustrated. The system 10 is configured to obtain images of a scene and to process the images to identify portions of the scene containing a warm body having a specific or target color or color range. As used hereinafter, a warm body may refer to a human, animal, or man-made machine that typically has a higher temperature than the surrounding environment and background. For example, body surface temperature of a human or animal is generally higher than surrounding air temperature, especially at night. As used hereinafter, the scene 2 refers to all objects and background elements within a field of view of the system 10. The target color may be any color that identifies or distinguishes a portion of a particular warm body from the rest of the warm body or from other warm bodies in the scene 2. For example, the system 10 may identify portions of a warm body that are a human skin color. The presence of human skin color in an image differentiates a human body from other animals or machines that may be identified. In one embodiment, the system 10 may be a portable apparatus in which the elements of the system 10 are contained or enclosed in a housing 4. Alternatively, the system 10 may be made up of separate elements or modules temporarily or permanently connected together for the purpose of obtaining and processing captured images. The system 10 may be provided for use in home or commercial security systems, video surveillance systems, motor vehicle operating or safety systems, military applications, search and rescue applications, facial recognition systems, night vision systems, medical applications, or other uses that require a user to determine when or if a warm body or material is present within a field of view.

With continued reference to FIG. 1, the system 10 includes a thermal detector 12, such as a thermal imaging camera, configured to obtain a thermal image of the scene 2. In a thermal image, pixel brightness shows portions of the scene 2 emit the most thermal radiation. The thermal detector 12 may be any commercially available thermal imaging camera capable of detecting thermal radiation emitted by a warm body, such as the Fluke Ti32 thermal imager manufactured by Fluke Corporation of Everett, Wash. Other similar images produced by manufacturers such as FLIR Systems Inc, Raytheon, DRS, and BAE may also be utilized. The thermal detector 12 may operate in a spectral band of either 3-5 microns or 8-12 microns, each of which are known to effectively propagate through the atmosphere. The thermal detector 12 may be a video camera and may be configured to record and process thermal images in real time, such as at a rate of at least 15 Hz.

Figure 2:
FIG. 2 is a thermal image captured by a thermal detector of the system of FIG. 1.

The system 10 may be adapted for use at night and in other environments with low ambient light. At night, human and animal targets are typically warmer than background materials. Therefore, as shown in the thermal image illustrated in FIG. 2, human bodies 110 appear brighter than the surrounding environment. However, animals, such as deer, rodents, dogs, and other warm-blooded mammals would also appear brighter in a captured thermal image. Therefore, image analysis of another image in another waveband is performed in conjunction with or following the thermal image to distinguish between different warm bodies identified by processing the thermal image.

The system 10 may include focusing elements, such as a thermal objective lens 14, for focusing thermal radiation emitted from objects in the scene 2 to the detector 12. The lens 14 may be any suitable material capable of directing the emitted radiation to the detector 12. The detector 12 and/or lens 14 may also include one or more filters (not shown) for excluding radiation outside of specific wavebands detected by the detector 12.

The system 10 further includes one or more additional detectors for obtaining additional images of portions of the scene 2. The additional detector may obtain an image of the same scene 2 as the thermal detector 12 or may obtain images of only the portions of the scene 2 with elevated temperature, as determined by analysis of the thermal image. The additional detectors capture images in an additional waveband different from the waveband of the thermal detector 12. The additional detector may be an infrared detector that captures images in the infrared spectra. The additional detector may also be a visual color detector that obtains an images of the scene 2 in the visible spectrum (approximately 0.4 to 0.7 microns).

In one embodiment, the system 10 includes two additional detectors, namely a Short Wave Infrared (SWIR) detector 16 and a Near Infrared (NIR) detector 18. The system 10 may also include two SWIR detectors configured to measure an optical signal in different distinct wavebands of the SWIR spectra. The NIR detector may operate in a spectral band of about 0.7 to about 0.9 microns The NIR detector 18 may be configured as a CCD or CMOS imager which has the infrared cutoff filter removed, thus allowing the silicon-based (Si) detector material access to the full spectral range. The SWIR detector 16 may operate in a spectral band of about 0.9 to about 1.7 microns. The SWIR detector 16 may be configured as an indium-gallium-arsenide InGaAs based detector. Such detectors are available from manufacturers such as UTC Sensors Unlimited, Xenics, and FLIR Systems Inc.

It has been determined that by measuring an optical signal in multiple distinct wavebands, testing accuracy can be improved and the number of false positive results reduced. For example, the SWIR detector 16 may be configured to detect an infrared image in a waveband having a wavelength that is absorbed by the target color to be identified. The NIR detector 18 may be configured to obtain an infrared image in a second waveband including a wavelength of infrared light that is reflected by the target color. For a system 10 configured to identify a range of human skin colors, it has been determined that a waveband of about 0.9 to 1.3 microns is reflected and a waveband of about 1.4 to 1.7 microns is absorbed.

As was the case with the thermal detector 12, the system 10 may include optics, such as an SWIR objective lens 20 and an NIR objective lens 22, for directing infrared radiation to the infrared detectors 16, 18. The system 10 may also include filters for filtering other wavelengths of infrared radiation, so that only energy within the desired wavebands is provided to the detectors 16, 18.

Since the system 10 is configured for use at night or in other low ambient light environments, the system 10 may also incorporate an active illumination source, referred to herein as illuminators 24, 26, which provides illumination while the additional (e.g., non-thermal) images are being obtained. The system 10 may include multiple illuminators for providing illumination within the wavebands collected by the detectors 16, 18, such as an SWIR illuminator 24 and NIR illuminator 26. Alternatively, the system 10 may include a single illuminator that provides illumination across a full spectrum of light, including but not limited to, within the NIR/SWIR spectral bands. Filters may be used to exclude or limit wavelengths emitted from the illuminators 24, 26 or provided to the detectors 16, 18. The illuminators 24, 26 may be any suitable source of light or radiation including a light emitting diode (LED), diode lasers, or halogen bulb projectors. Other bulbs, radiant coils, or other light and heat sources may also be used as illuminators 24, 26. The illuminators 24, 26 may operate continually, at least when the system 10 is in use, or may be configured to momentarily flash or trigger while an image is being captured by the infrared detectors 16, 18.

With continued reference to FIG. 1, the system 10 may further include a controller or processor 28 connected to or associated with the other electrical elements of the system 10. The processor 28 may be configured to perform a skin detection algorithm, video fusion algorithm, and/or to support a graphical user interface for the system 10. For example, in one embodiment, the processor 28 analyzes the thermal image obtained by the thermal detector 12 to determine which areas or portions of the scene 2 have a temperature within a range of interest. The processing algorithm may include identifying pixels of the thermal image that have a brightness within a predetermined range. Thereafter, a single image-wide threshold value is set above which all pixels would be considered potential targets for interrogation. More advanced processing could segregate targets against just a local area background which is a fraction of the entire image. This may be more appropriate for use with thermal camera systems which employ a technique known as local area enhancement that is used to artificially enhance the image contrast on the display. Alternatively, the brightness of each pixel may be compared to a threshold value to estimate the temperature or the pixels may be compared with adjacent pixels or a background or baseline to determine differences.

Once areas of the scene 2 that are within the temperature range of interest are identified, the processor 28 may direct the illuminators 24, 26 and infrared detectors 16, 18 to focus on the identified areas. The processor 28 may actuate the illuminators 24, 26 to illuminate the identified areas of the scene 2. In conjunction with actuating the illuminators 24, 26, the processor 28 may direct the infrared detectors 16, 18 to obtain infrared images of the identified areas. Once the one or more infrared images are obtained, the images are processed by the processor 28 to determine if the target color is present. If an area of the scene 2 is found to have both an elevated temperature within the range of interest, as determined from analysis of the thermal image, and the target color, based on analysis of the infrared images, then the processor 28 outputs a positive response.

In cases where infrared images in multiple wavebands are obtained, the processing algorithm may include fusing the obtained infrared images, such as by calculating an NIR/SWIR ratio for each pixel of the images. The ratio compares the intensity of the obtained image in the NIR spectra to the intensity of the image in the SWIR spectra. For areas of the scene 2 where the target color is present, the NIR intensity should predominate over the SWIR intensity, which is largely absorbed by the target color. The processor 28 determines that the target color is present in areas of the fused image having an NIR/SWIR ratio within a predetermined range.

The system 10 may further include an alarm 30 that triggers when a positive response is identified by the processor 28. The alarm 30 may be an audible alarm, such as a beep. The audible alarm may also include a recorded message that is played for an operator or, in certain embodiments, for the person identified in the scene 2. The alarm 30 may also be a visual alarm. For example, a light indicator or LED may illuminate when a human or animal is identified in the scene 2. Other alarms, such as tactile or vibrating alarms, may also be used for specific applications. The system 10 may also be configured to send an alarm signal to a remote location over a communications network, such as a Wi-Fi or cellular network, when a positive response is identified. For example, the system 10 may be configured to send an alarm or request for help to police or other emergency personnel if a human is identified in the scene 2.

In some embodiments, the system 10 may include a visual display 32. When a positive response is output by the processor 28, a message to an operator may be displayed on the visual display 32. The message could include information related to the positive response, such as the date and time when the event was recorded, the present location of the human or animal identified in the scene 2, or any other identifying information about the identified person or animal (e.g., height, weight, etc.). In addition, the system 10 may display a real time thermal image of the scene 2 on the visual display 32. The thermal image may be automatically annotated or modified to highlight the portions of the scene 2 that include the target color. For example, the processor 28 may be configured to change any pixels for areas or portions of the scene 2 where the target color is present to a brighter and more noticeable color, such as neon green, so that the identified pixels can be easily seen by the operator.

Figure 3:
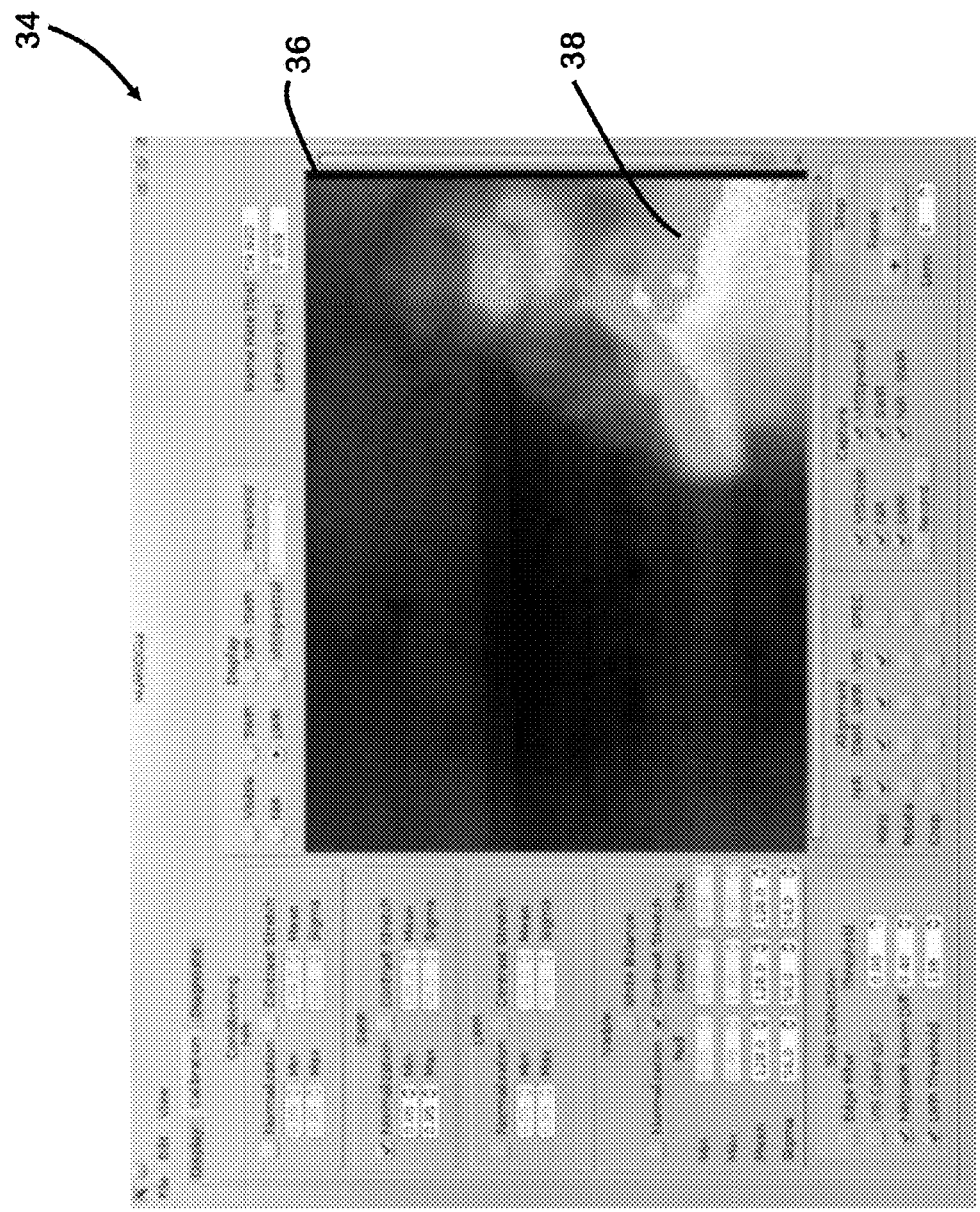
FIG. 3 is a screen capture of a visual display of the system of FIG. 1.

With reference to FIG. 3, a screen capture of a user interface 34 of the system 10 that can be displayed on the visual display 32 is provided. The user interface 34 includes a thermal image 36 obtained by the thermal detector 12. The image is modified so that identified pixels 38, namely pixels that have both elevated temperature and the target color, are highlighted. The user interface 34 may also include various menus for modifying or optimizing the processing capabilities of the system 10. For example, an operator may use the user interface 34 to control or change threshold values or to change how often an image is obtained and processed.

In a non-limiting embodiment, the system 10 may be integrated or associated with a system for identifying a human or other object in daylight. The daylight system may use the infrared detectors 16, 18 or other image detection and/or processing techniques for obtaining an image in daylight and for determining whether a target color, such as skin tone is present. Notably, a daylight system would not need a thermal detector 12 or illuminators 24, 26 since ambient light would provide sufficient illumination for obtaining images that could be processed to identify the target color. The controller 28 may be configured to switch between the daylight imaging system and night imagining system to produce a system that can be used 24 hours a day. For example, the system 10 may include a light sensor that switches between the daylight and night systems based on the level of available ambient light. Alternatively, the system 10 may use a clock for determining which system 10 to use at a particular time.

Figure 4:
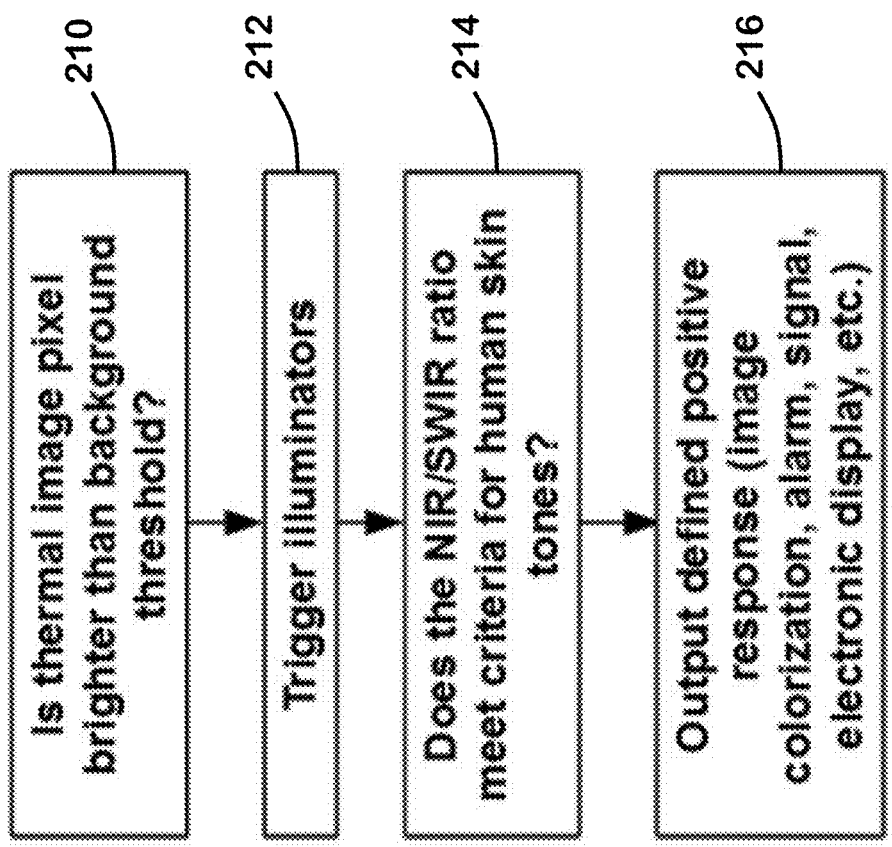
FIG. 4 is a flow chart showing steps for analyzing images to identify a target color, according to an embodiment of the invention.

With reference to FIG. 4, a method of analyzing images of a scene to identify a target color are presented. The method includes obtaining a thermal image of the scene. The thermal image may be obtained by a thermal imaging camera or other suitable imaging device. Once the thermal image is obtained, the thermal image is processed to identify areas of the scene that have a temperature greater than a predetermined threshold value. Specifically, the processing routine may inquire whether a pixel of the thermal image is brighter than a background threshold 210.

With continued reference to FIG. 4, the method may further include triggering illuminators 212 to illuminate portions or areas of the scene 2 identified on the thermal image. The illuminators may illuminate the entire scene 2 or may be targeted to the specific identified portions or areas. The illuminators 26, 24 may remain on for an extended period of time. Alternatively, the illuminators may flash or trigger momentarily. While the scene 2 is illuminated, one or more infrared images of the scene are obtained in distinct wavebands of the infrared spectrum. For example, an image may be obtained in the NIR spectra and in the SWIR spectra. Alternatively, infrared images in distinct SWIR wavebands, such as a first waveband of between 1.0 and 1.3 microns and a second waveband of 1.4 to 1.7 microns, may be obtained. The infrared images may be fused together through a processing routine and then processed to determine whether the target color is present. For example, the fusion step may include calculating a ratio of NIR/SWIR intensity. The calculated intensity ratio may be compared to known ratio values that are representative of the target color. For example, when determining whether human skin tone is present, the method asks whether the NIR/SWIR ratio meets criteria for human skin tones 214. If any pixels of the fused image having the required ratio are identified, an output may be provided that defines a positive response 216. The output may include a local alarm, such as an audio or visual alarm, transmission of relevant information concerning the alarm to a remote source, or image colorization of identified areas on a visual display showing the thermal image. The method may be repeated continually in real time or at periodic intervals to determine whether the composition of the scene 2 has changed and whether target objects are present or absent from the scene.

While the system and method of the present invention has been described hereinabove for the detection of human skin colors, this is not to be construed as limiting the present disclosure as the principles of the present disclosure may be utilized for the detection of other objects. For example, using the system and method of the present disclosure at night requires the target to have a thermal radiance difference when compared to the local background, but otherwise the visible, near- and short-infrared signatures of the target can be varied. Accordingly, the system and method of the present disclosure may also be used to identify worn clothing or to distinguish between colors of paint on the hood of a motor vehicle. The range of wavelengths for all these cases would likely be very similar to those used in detection of human skin, but the specific ratios of one color band to another may be different and this difference is processed by the software provided on the processor. A system with such software processing could thus be made to analyze incoming scene contents and compare against a set of known target templates in order to find the best match. In this way, the display output is required to identify the different target types. For example, human skin detections might be colorized green, certain types of man-made clothing would be blue, and certain types of vehicle paint might be colorized yellow on the display.

While embodiments of the system and method for identifying a target color on a warm body are provided, those skilled in the art may make modifications and alterations to these embodiments without departing from the scope and spirit of the disclosure. Accordingly, the foregoing description is intended to be illustrative rather than restrictive. The disclosure described hereinabove is defined by the appended claims and all changes to the disclosure that fall within the meaning and the range of equivalency of the claims are to be embraced within their scope.

The invention claimed is:

1. A system for analyzing images of a scene to identify a target color, the system comprising:
a thermal detector for obtaining a thermal image of the scene within a thermal waveband;
at least one additional detector for obtaining at least one additional image of the scene at an additional waveband different from the thermal waveband; and
a controller configured to:
process the thermal image to identify portions of the scene having a temperature exceeding a threshold value;
process the additional image to identify portions of the scene having the target color; and
output a positive response if a same portion of the scene is identified in the thermal image and in the additional image.

2. The system of claim 1, wherein the additional detector is an infrared detector or a visible light detector.

3. The system of claim 1, wherein the thermal detector obtains thermal images of the scene in real time.

4. The system of claim 1, wherein the controller activates the additional detector to obtain the additional image when portions of the scene having a temperature exceeding a threshold value are identified by processing the thermal image.

5. The system of claim 1, further comprising an illuminator that illuminates the scene with radiation in the additional waveband.

6. The system of claim 5, wherein the controller is configured to activate the illuminator while the additional image is being obtained by the additional detector.

7. The system of claim 5, wherein the illuminator comprises a light emitting diode, a laser diode, or a halogen bulb projector.

8. The system of claim 1, wherein the at least one additional detector comprises a first infrared detector that obtains a first infrared image in a first infrared waveband and a second infrared detector that obtains a second infrared image in a second infrared waveband, the first waveband being different than the second waveband.

9. The system of claim 8, wherein the first waveband includes a wavelength absorbed by the target color and the second waveband includes a wavelength reflected by the target color.

10. The system of claim 8, wherein the first waveband is between 1.4 and 1.7 microns and the second waveband is between 0.9 and 1.3 microns.

11. The system of claim 8, wherein the controller is configured to process the first infrared image and the second infrared image by: calculating a ratio of infrared intensity in the first infrared image and the second infrared image for each pixel; and comparing the calculated ratio to a threshold ratio value.

12. The system of claim 1, further comprising an alarm, wherein the alarm is triggered when the controller outputs a positive response.

13. The system of claim 1, further comprising a visual display configured to display the thermal image, wherein pixels of the thermal image showing portions of the scene where the target color is present are replaced with brighter pixels when displayed on the visual display.

14. The system of claim 1, wherein the thermal detector is configured to detect a waveband of between 3 and 5 microns or between 8 and 12 microns.

15. The system of claim 1, further comprising a daylight system for identifying the presence of the target color in the scene in daylight or in other environments with ambient light.

16. The system of claim 1, wherein the target color is a range of possible human skin tones.

17. The system of claim 1, further comprising a portable housing, wherein the thermal detector, the at least one additional detector, and the controller are at least partially contained within the housing.

18. A method for analyzing images of a scene to identify a target color, the method comprising:
obtaining a thermal image of the scene;
identifying a portion of the scene that has a temperature that exceeds a threshold value by processing the thermal image;
obtaining an infrared image of the scene;
identifying a portion of the scene that includes a target color by processing the infrared image; and
outputting a positive response if a same portion of the scene was identified in both the thermal image and the infrared image.

19. The method of claim 18, further comprising illuminating at least the portion of the scene identified in the thermal image while obtaining the infrared image.

20. The method of claim 18, wherein obtaining the infrared image comprises obtaining an infrared image in at least two distinct wavebands, wherein the first waveband is reflected by the target color and the second waveband is absorbed by the target color.

* * * * *